United States Patent [19]

Merrill et al.

[11] Patent Number: 4,893,413
[45] Date of Patent: Jan. 16, 1990

[54] STEERING WHEEL CENTERING DEVICE

[75] Inventors: Marcellus S. Merrill, Denver; Richard E. Kiefer, Boulder, both of Colo.

[73] Assignee: Merrill Engineering Laboratories, Inc., Englewood, Colo.

[21] Appl. No.: 159,778

[22] Filed: Feb. 24, 1988
(Under 37 CFR 1.47)

[51] Int. Cl.$^4$ ................................................ G01C 9/00
[52] U.S. Cl. .......................................... 33/371; 33/366; 33/203.12
[58] Field of Search ................. 33/600, 608, 366, 644, 33/645, 203.12, 203.13, 203.14, 203.15, 203, 333, 335, 370, 369, 371, 372; 116/31

[56] References Cited

U.S. PATENT DOCUMENTS

| | | | |
|---|---|---|---|
| 3,091,862 | 6/1963 | MacMillan | 73/288 |
| 3,624,915 | 12/1971 | Wilkerson | 33/203.18 |
| 3,813,932 | 6/1974 | Wallace | 73/118.1 |
| 3,889,527 | 6/1975 | Wallace | 73/118.1 |
| 3,980,999 | 9/1976 | Nishioka et al. | 340/56 |
| 4,007,357 | 2/1977 | Yanagishima | 377/45 |
| 4,342,279 | 8/1982 | Seko et al. | 116/31 |
| 4,485,371 | 11/1984 | Yamada et al. | 116/31 |
| 4,679,327 | 7/1987 | Fouchey et al. | 33/203.13 |
| 4,690,557 | 9/1987 | Wiklund | 33/288 |

FOREIGN PATENT DOCUMENTS

| | | | |
|---|---|---|---|
| 2830257 | 1/1980 | Fed. Rep. of Germany | 33/305 |
| 5752802 | 3/1980 | Japan | 33/203 |

Primary Examiner—William A. Cuchlinski, Jr.
Assistant Examiner—Jeffrey J. Hohenshell
Attorney, Agent, or Firm—Sheridan, Ross & McIntosh

[57] ABSTRACT

The present invention discloses apparatus and method for centering the steering wheel of a vehicle prior to alignment of the vehicle wheels using a wheel aligner. A portion of the apparatus is mounted to the vehicle steering wheel for sensing deviation in the position of the steering wheel from a centered position. This portion of the apparatus can be mounted on vehicle steering wheels having different configurations and can wirelessly transmit signals corresponding to the deviations. The apparatus can be used with differently configured steering wheels by virtue of a linked cam assembly in which rotation of either of a pair of cams causes rotation of the other cam in an opposite direction of equal magnitude. In operation, the deviation in the position of the steering wheel from a centered position with a pre-selected tolerance is determined. When the deviation is greater than the pre-selected tolerance, alignment of the vehicle wheels by the wheel aligner is prevented.

6 Claims, 4 Drawing Sheets

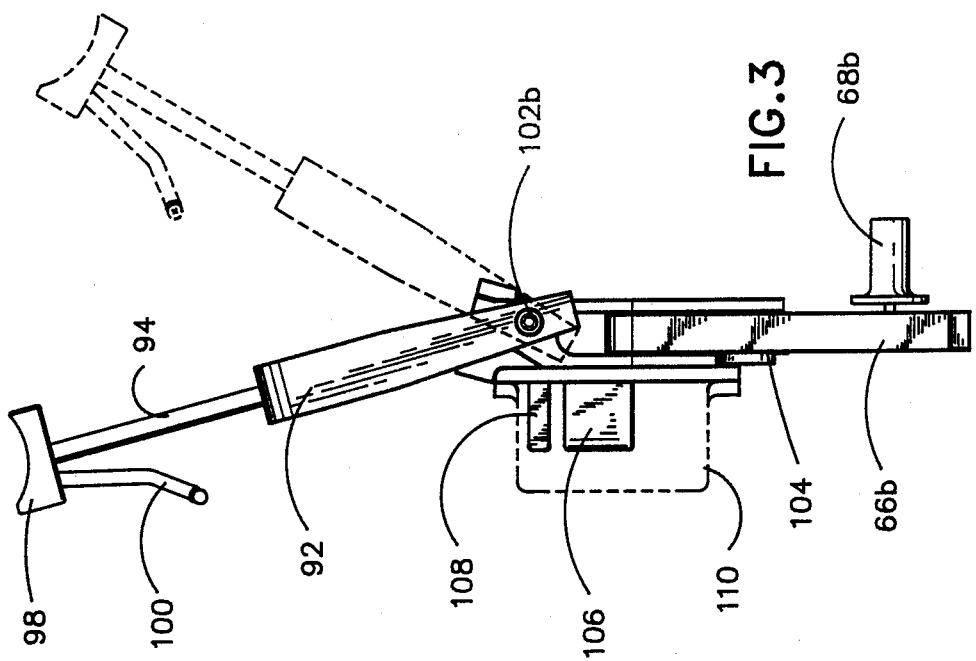

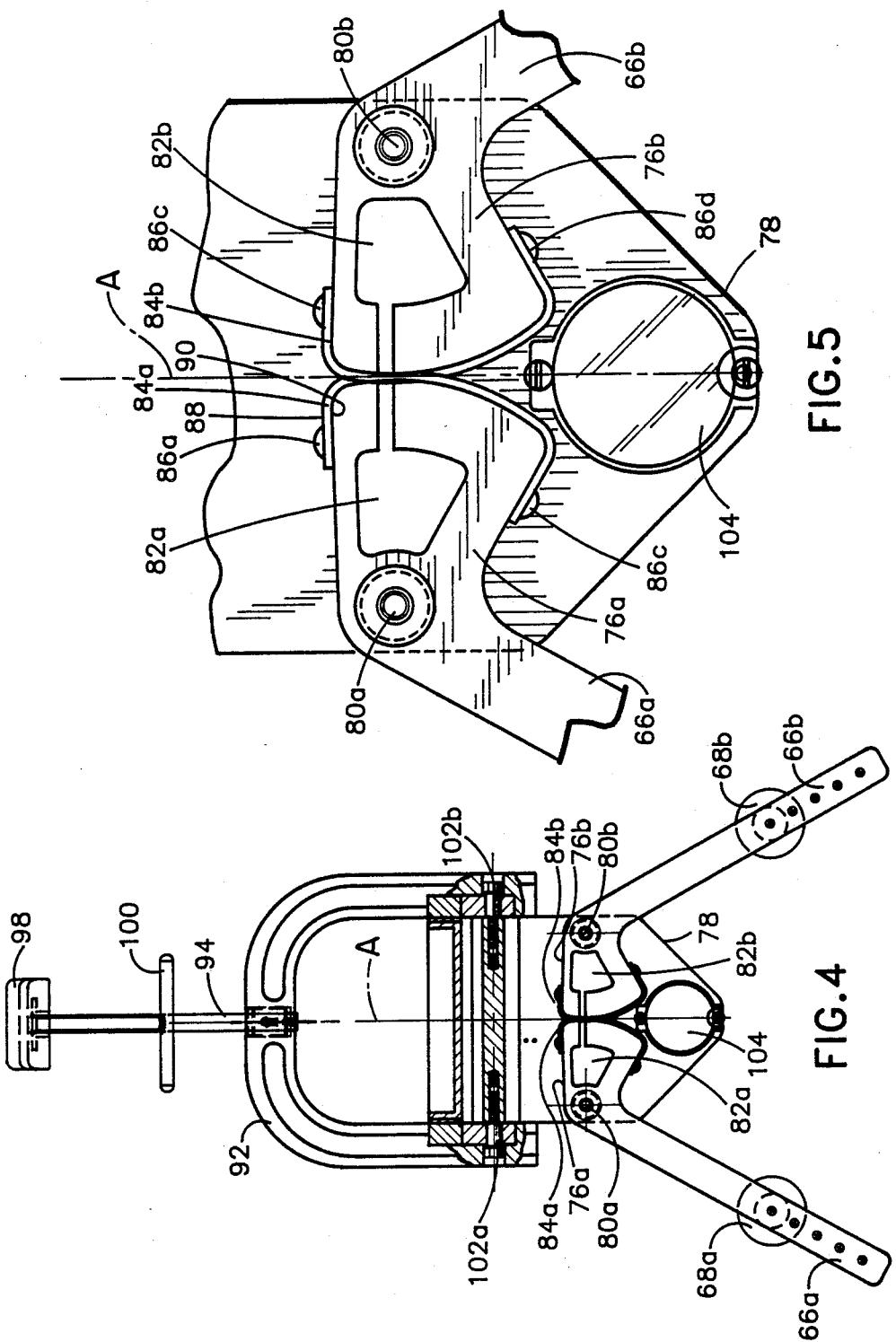

STEERING WHEEL CENTERING DEVICE

FIELD OF THE INVENTION

The field of this invention relates generally to alignment of wheels on vehicles. More particularly, the invention involves method and apparatus for locating a vehicle steering wheel at a centered position so that the vehicle wheels can be aligned when the steering wheel is in a proper position.

BACKGROUND OF THE INVENTION

During the alignment of vehicle wheels, it is important that the steering wheel of the vehicle be in a centered position before the vehicle wheels are aligned into their straight ahead position. Typically, during alignment operations, a vehicle steering wheel is first centered and then the wheels of the vehicle are aligned. If a steering wheel is not in a centered position when the vehicle wheels are aligned, later operation of the vehicle with the steering wheel in a centered position will cause the vehicle to turn because the wheels will not be in straight ahead alignment. Various apparatuses have been proposed or devised for assuring that the steering wheel is in its centered position prior to alignment of the vehicle wheels.

One known device for centering a vehicle steering wheel includes a level and an assembly for engaging the molding of the vehicle windshield. The level is aligned with respect to the steering wheel. If the level does not indicate the correct position, the operator adjusts the position of the steering wheel until the level reads correctly. After a correct reading, the operator can indicate that alignment of the wheels should proceed. The usefulness of this apparatus is limited because it relies on human accuracy for reading the level and adjusting the steering wheel to a correct position. This system also does not prevent human error from allowing alignment of vehicle wheels prior to centering of the steering wheel.

In another known system, an apparatus is provided which is attached to a steering wheel which electronically determines whether the steering wheel is centered. This device is connected by wires to an outside apparatus for communication of the steering wheel position information. The wires used in this device can damage the painted surface of the vehicle and also require either that the window of the vehicle be down or that the vehicle door be open. The wires also add further hardware to the system and present the danger of drive off damage or entanglement with other devices in a manufacturing environment.

Other devices for monitoring steering wheel position are known. For example, Seko, et al., U.S. Pat. No. 4,342,279, Aug. 3, 1982, discloses a device for detecting steering angle and direction. This device includes two contacts which are affixed to a steering column and adapted to be engaged by a movable contact when the steering wheel is turned. Upon contact, a pulse signal is produced and is sent to an electric circuit for detecting rotation.

Yanagishima, U.S. Pat. No. 4,007,357, Feb. 8, 1977, discloses a circuit for detecting relative angular displacement of a steering wheel for use in a safety apparatus to trigger an alarm device in the event of a prolonged absence of steering operation during normal driving conditions. This circuit includes a pair of up-down counters which are operated to count up or down in response to the direction of steering movements.

Another electrical circuit arrangement for detecting the relative angular movement of a steering wheel is disclosed in Nishioka, et al., U.S. Pat. No. 3,980,999, Sept. 14, 1976. In this invention, the steering movements of a motor vehicle are translated into an electrical signal which increases voltage as the steering wheel rotates in one direction and decreases as the steering is reversed.

In U.S. Pat. Nos. 3,813,932, June 4, 1974, and 3,889,527, June 17, 1975, to Wallace, steering linkage testing apparatuses are disclosed. These apparatuses are designed to test the play in the linkage between the wheels of a vehicle and the steering wheel. These references describe a device which includes a sensing means for determining movement of a vehicle's wheels and a steering wheel movement indicating means for determining the amount of steering wheel movement which occurs prior to movement of the vehicle's wheels. In U.S. Pat. No. 3,889,527, the steering wheel indicating means attaches to a steering wheel by means of a hanger. The device is further supported on a steering wheel by parallel cross pieces which rest on the front of the face of the steering wheel. The device can be adjusted to different steering wheel sizes by adjusting a slidable plate to which the cross pieces are attached so that the apex of the steering wheel is gripped between the hanger and a bottom support piece which is attached to the upper cross bar.

MacMillan, U.S. Pat. No. 3,091,862, June 4, 1963, discloses a device for positioning the wheels of a vehicle in a straight ahead position so that the steering wheel can then be centered. This invention includes mechanical devices for positioning front and rear wheels in desired positions. The device of MacMillan is intended for use in adjusting the steering wheel position after the alignment of the wheels has been altered from the original factory alignment. U.S. Pat. No. 3,624,915, Dec. 7, 1971, to Wilkerson, also describes a wheel alignment apparatus. The disclosed device includes an improved wheel clamp.

A steering wheel system is described in Yamada, et al., U.S. Pat. No. 4,485,371, Nov. 27, 1984, which provides a driver with a confirmation of the direction of the orientation of the front wheels of a vehicle. This reference describes a unit mounted on a steering wheel and connected to the front wheels by a differential gear reduction mechanism.

Although alignment systems and steering wheel centering systems are known, it would be advantageous to provide a vehicle steering wheel centering device that reduces or eliminates drawbacks that exist in known systems.

SUMMARY OF THE INVENTION

The present invention provides a method and apparatus for centering a steering wheel of a vehicle to a centered position prior to alignment of the vehicle's wheels. The apparatus includes a centering unit for sensing the position of the steering wheel with respect to a predetermined centered position. The centering unit communicates by wireless transmission with an electronic centering apparatus, which includes a transceiver, processor and a display unit. An infrared signal indicating the deviation between the steering wheel's actual position and a centered position is sent by the centering unit to the centering apparatus. The infrared signal is received by the transceiver and a corresponding electric signal is sent to the processor. The processor then causes the display unit to display a representation of the deviation in steering wheel position.

The processor is also programmed with a preselected tolerance of steering wheel position deviation from a centered position. The processor compares this tolerance with the actual deviation. The processor communicates with a controller which controls operation of an automatic wheel alignment device. If the actual deviation is greater than the tolerance, the processor sends a signal to the controller of the wheel aligner instructing the controller to prevent alignment of the vehicle's wheels by the alignment device. If the actual deviation is less than the tolerance, the processor instructs the controller to allow alignment.

The centering unit of the present invention includes a steering wheel holding assembly and a sensing assembly. The steering wheel holding assembly includes a pair of arms connected to cooperating cams. The cams are linked in a manner such that movement of either cam causes an opposite direction movement of equal magnitude of the other cam. By virtue of the linked cam assembly, the steering wheel holding assembly can position the centering unit on differently configured steering wheels so that a center line of the steering wheel is aligned perpendicular to a level line defined by the sensing assembly. The sensing assembly includes an electronic level which defines the level line. By positioning the level line in a horizontal position, the center line of the steering wheel is positioned in a centered position. The output of the sensing assembly is the infrared signal transmitted to the electronic centering apparatus for processing and analysis.

BRIEF DESCRIPTION OF THE DRAWINGS

FIG. 3 is a side view of the steering wheel centering unit;

FIG. 4 is a full front cut-away view of the steering wheel centering unit; and

FIG. 5 is a partial front cut-away view of the steering wheel centering unit illustrating the cooperating cam mechanism.

DETAILED DESCRIPTION

The present invention relates to an apparatus and method for centering a steering wheel to a centered position. During the manufacture of a vehicle, prior to alignment of the vehicle's wheels, the steering wheel of the vehicle must be positioned in a centered position. Otherwise, a straight-ahead position of the steering wheel might not coincide with a straight-ahead position of the vehicle's wheels.

The present invention includes a steering wheel centering unit for centering a steering wheel. This unit generates a signal indicating steering wheel position which is sent to an electronic centering apparatus by wireless transmission. The electronic centering apparatus receives the signal relating to position of the steering wheel and compares the deviation between the actual position and a centered position with a predetermined tolerance. The electronic centering apparatus also numerically and graphically displays the position of the steering wheel. Alignment of the wheels of the vehicle is controlled by an alignment controller. The electronic centering apparatus communicates with the controller to prevent alignment of the vehicle's wheels by a wheel alignment unit when the steering wheel is not within a preselected tolerance of a centered position.

Figure 2:
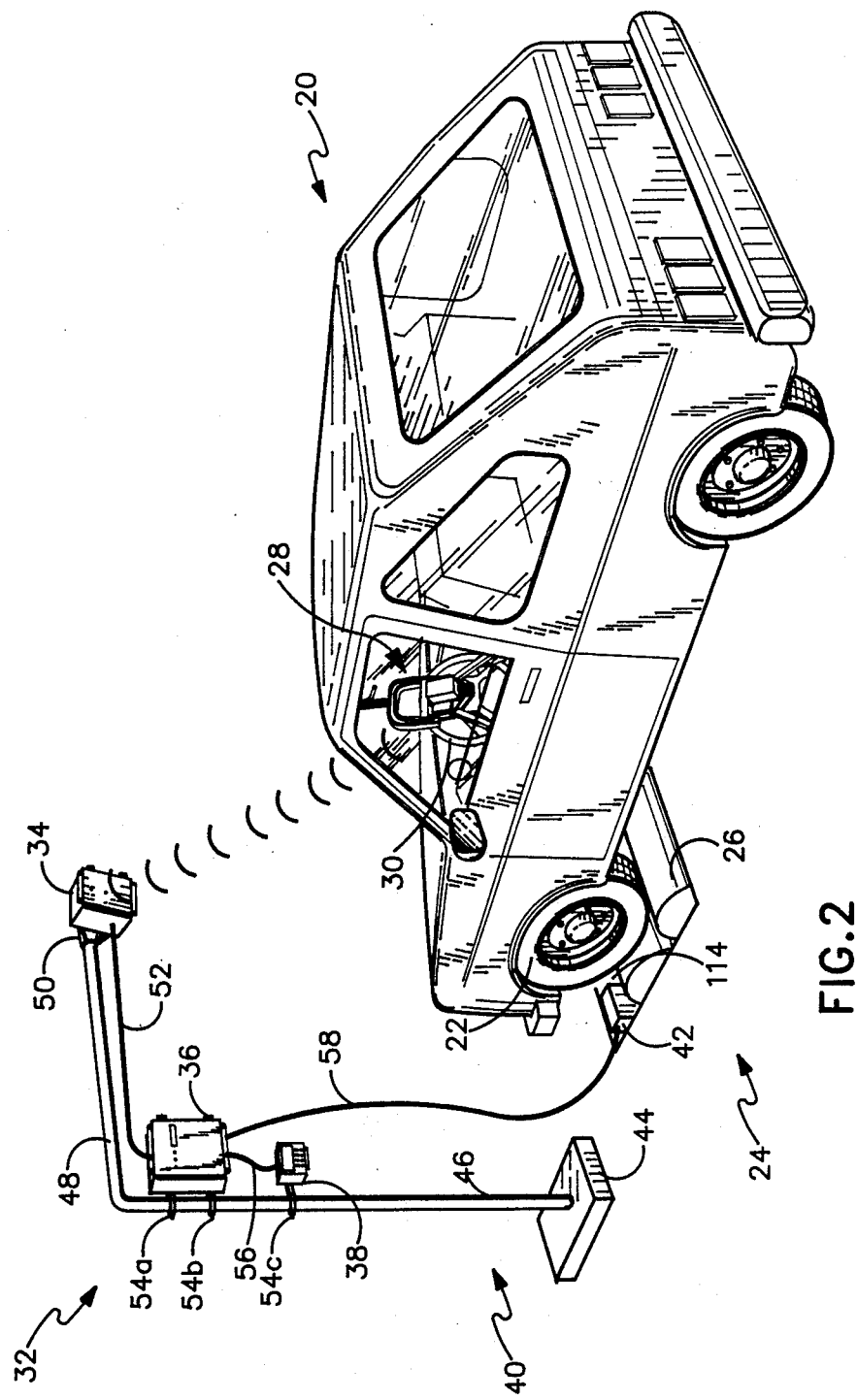
FIG. 2 is an illustration of the components of a preferred embodiment of the invention for centering a vehicle steering wheel prior to alignment of a vehicle's wheels.

With reference to FIG. 2, a specific embodiment of the invention is illustrated. A vehicle 20 is shown in a manufacturing environment. The front wheels 22 of the vehicle are positioned over an automatic wheel aligning unit 24 including wheel alignment rollers 26. A steering wheel centering unit 28 is shown positioned on the vehicle steering wheel 30. The steering wheel centering unit 28 senses the deviation between the position of the steering wheel 30 and a centered position. This information is transmitted by the centering unit 28 to the electronic centering apparatus 32. Also shown in FIG. 2 is the electronic centering apparatus 32, which includes a transceiver 34, a processor 36, a display unit 38, and an electronic support assembly 40. The electronic centering apparatus 32 communicates with an alignment controller troller 42. The controller 42 controls operation of the wheel alignment unit 24.

In FIG. 2 an electronic support assembly 40 is illustrated which includes a support platform 44, a pole 46, and a cross piece 48. The pole 46 is connected to the support platform 44 in a substantially vertical position. At the top of the pole 46 is attached the cross piece 48 which extends directly in front of and above the windshield of the vehicle 20. Near the end of the cross piece 48, the centering apparats transceiver 34 is attached thereto by a clamp 50. The centering apparatus transceiver 34 is electrically connected to the processor 36 by a transceiver conducting line 52. The processor 36 is attached to the pole 46 by means of fasteners 54a, 54b. The processor 36 also communicates with the display unit 38 by means of a display conducting line 56. The display unit 38 is connected to the pole 46 by means of a fastener 54c. The processor 36 is also in electrical communication with the alignment controller 42 by means of a controller conducting line 58.

Figure 1:
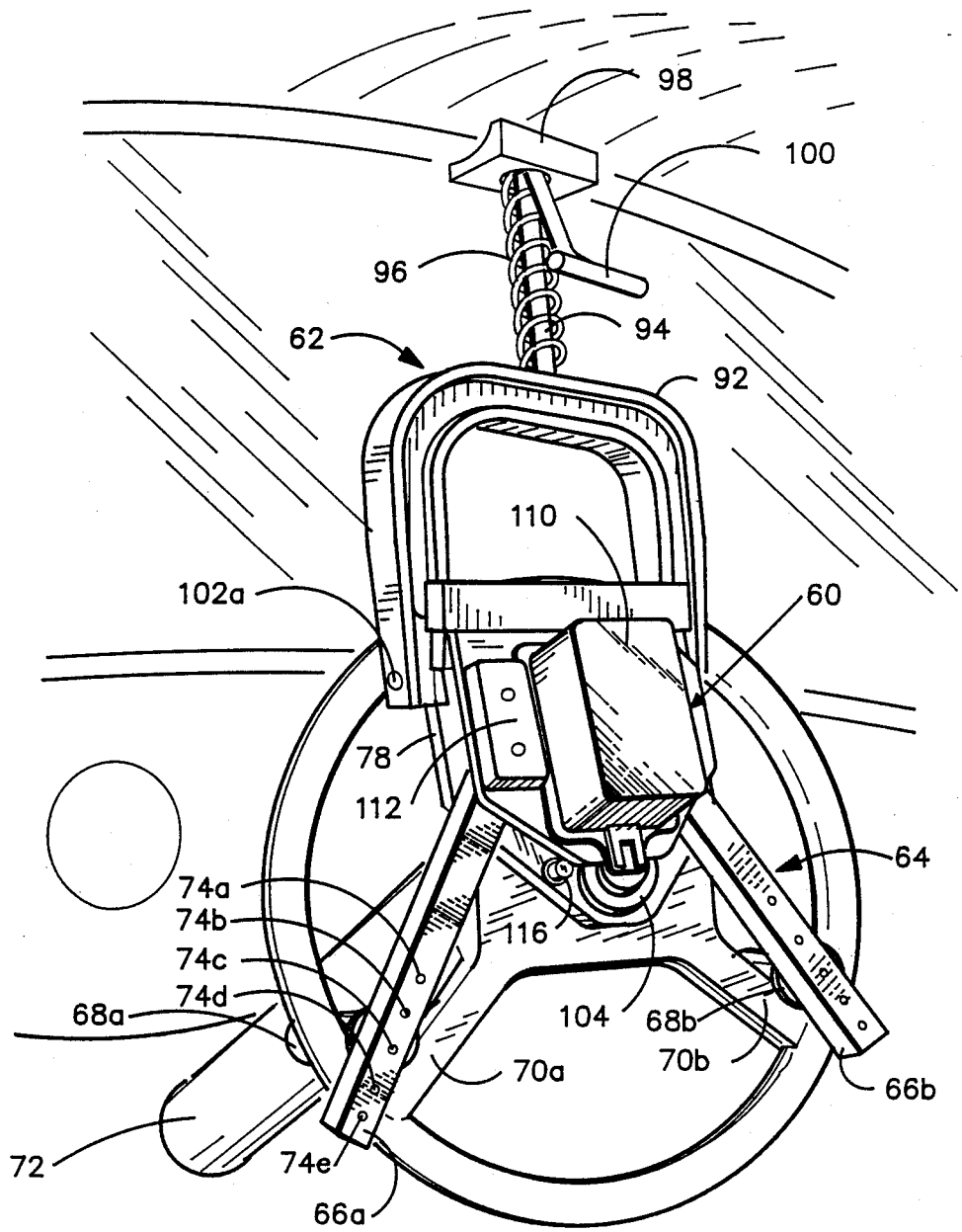
FIG. 1 is a perspective view of the steering wheel centering unit positioned on a steering wheel.

With reference to FIG. 1, the steering wheel centering unit 28 is shown in position on a vehicle steering wheel 30. The centering unit 28 includes a sensing assembly 60, a vehicle attachment assembly 62, and a steering wheel holding assembly 64. without reference to FIGS. 1, 4, and 5, the steering wheel holding assembly 64 is shown more specifically. The holding assembly 64 includes a pair of arms 66a, 66b. Each of the arms 66a, 66b has steering wheel rollers 68a, 68b, as shown in FIGS. 1 and 4. When the steering wheel centering unit 28 is correctly positioned on a steering wheel, each steering wheel roller 68a, 68b rests on an inside diameter portion of the steering wheel 30 against a connecting element 70a, 70b and extends toward the front part of the vehicle 20. Many vehicle steering wheels have a configuration similar to the one shown in FIG. 1. The steering wheel 30 is attached to the steering wheel column 72 by some steering wheel connecting elements 70a, 70b. The connecting elements 70a, 70b on a steering wheel 30 should be symmetrically located about the steering wheel 30 for correct positioning of the centering unit 28 on the steering wheel 30.

The rollers 68a, 68b are rotatably attached to the arms 66a, 66b. As the steering wheel holding assembly 64 is positioned on a steering wheel 30, the rollers 68a, 68b are able to easily slide into position because they rotate. The rollers 68a, 68b can also be attached at different positions along the arms 66a, 66b of the steering wheel holding assembly 64 to adjust for different sized steering wheels. A number of attachment holes 74a, 74b, 74c, 74d, and 74e, as illustrated in FIG. 4, are provided along the longitudinal extent of each arm 66a, 66b.

Each of the arms 66a, 66b is attached to cooperating cams 76a, 76b, as shown in FIGS. 4 and 5. By virtue of a cooperating mechanism between the cams 76a, 76b, the arms 66a, 66b can be positioned in a variety of configurations. In this manner, the centering unit 28 can be positioned on differently configured steering wheels. The cams 76a, 76b cooperate in such a manner that movement of either cam causes an opposite direction movement of equal magnitude of the other cam. Movement of one arm 66a, therefore, causes an opposite direction movement of equal magnitude of the other arm 66b. One result of such cooperating movement between the cams 76a, 76b and the arms 66a, 66b is that the angle defined by the arms 66a, 66b is bisected by a center line A, shown in FIG. 5, regardless of the position of the arms 66a, 66b. This feature is important to operation of the present invention, as discussed below, when the steering wheel centering unit 28 is positioned on a steering wheel 30. While a preferred embodiment of the cooperating mechanism is shown in FIG. 5, other embodiments, such as a gear assembly, are contemplated as well.

The cooperating mechanism between the cams 76a, 76b is shown in detail in FIG. 5. Each cam 76a, 76b is connected to the base 78 of the centering unit 28 at a rotatable attachment 80a, 80b. Each of the cams 76a, 76b has hollow spaces 82a, 82b in the center of the cam for reducing the weight of the cams. The cams 76a, 76b are connected by a pair of crossing straps 84a, 84b. Each strap 84a, 84b is connected to both cams 76a, 76b. As seen in FIG. 5, the straps 84a, 84b are attached to the cams 76a, 76b at the ends of the straps by strap fasteners 86a, 86b, 86c, 86d. Each strap 84a, 84b is connected to the cams 76a, 76b along the edge surfaces of the cams. For the following particular discussion of attachment of the straps 84a, 84b to the cams 76a, 76b, only one strap 84a will be discussed. However, it should be recognized that both straps 84a, 84b are attached to the cams 76a, 76b in a similar, symmetric manner. Particularly, crossing strap 84a has a top surface 88 and a bottom surface 90. At the point of attachment to cam 76a strap 84a is attached to cam 76a with its bottom surface 90 contacting cam 76a. Strap 84a wraps around the edge of cam 76a and between cam 76a and cam 76b. While strap 84a is in between cam 76a and cam 76b, the bottom surface 90 of strap 84a is contacting cam 76a and the top surface 88 of strap 84a is contacting cam 76b. Strap 84a then wraps around the corner of cam 76b so that the top surface of strap 84a is contacting and fastened to the edge of cam 76b. With both straps 84a, 84b fastened to cams 76a, 76b in this manner, effective cooperation between the cams 76a, 76b and the arms 66a, 66b is achieved.

The steering wheel centering unit 28 further includes a vehicle attachment assembly 62, as illustrated in FIGS. 1, 3, and 4. The vehicle attachment assembly 62 is connected to the base 78 of the steering wheel centering unit 28, as shown in FIGS. 1 and 4. The vehicle attachment assembly 62 includes a U-shaped member 92, an extendable rod 94, a spring 96, a molding stop 98, and a molding stop handle 100. The U-shaped member 92 is attached to the base 78 of the centering unit 28 at the open end of the U-shaped member 92. The base 78 of the centering unit 28 fits inside the open end of the U-shaped member 92. Bolts 102a, 102b pass through the distal ends of the U-shaped member 92 into the base 78 of the centering unit 28 for attachment. In this manner, the U-shaped member 92 can swivel about an axis approximately defined by the bolts 102a, 102b, as shown in FIG. 3.

The vehicle attachment assembly 62 further includes an extendable rod 94 which is attached to the U-shaped member 92. The rod 94 is attached to the U-shaped member 92 at the base of the U. The rod 94 extends in the direction away from the open portion of the U. Attached to the extendable rod 94, on the end opposite the attachment to the U-shaped member 92, is a molding stop 98. The surface of the molding stop 98 facing away from the extendable rod 94 has a generally concave surface. This surface is designed for gripping or fitting on the molding around a vehicle's windshield.

The vehicle attachment assembly 62 also includes a spring 96 which is coiled about the extendable rod 94 to exert a pressure on the molding stop 98 and the U-shaped member 92, as shown in FIG. 1. By virtue of the force exerted by the spring 96, the extendable rod 94 is forced to elongate. Attached to the molding stop 98 is a molding stop handle 100. The molding stop handle 100 is an essentially T-shaped member and positioned approximately opposite the direction of force created by the spring 96. By gripping the molding stop handle 100 and exerting force opposite the direction of force created by the spring 96, an operator can compress the spring 96 and extendable rod 94.

To position the steering wheel centering unit 28, an operator rotates the vehicle attachment assembly 62 in the direction of the front face of the centering unit 28, as shown in FIG. 3, so that the steering wheel centering unit base 78 can rest on the steering wheel 30 without the molding stop 98 contacting either the windshield or the roof of the vehicle. The steering wheel rollers 68a, 68b are positioned inside the steering wheel on the upper side of the respective steering wheel connecting elements 70a, 70b, as shown in FIG. 1. The operator positions the arms 66a, 66b so that each roller 68a, 68b contacts the steering wheel 30 at the connection to the connecting elements 70a, 70b. The operator then compresses the extendable rod 94 of the vehicle attachment assembly 62 by exerting a downward force on the molding stop handle 100 so that the vehicle attachment assembly 62 can be rotated into position until the molding stop 98 is aligned with the molding on the windshield of the vehicle. Pressure on the molding stop handle 100 is gradually released so that the force exerted by the spring 96 extends the extendable rod 94 causing the molding stop 98 to contact the molding on the vehicle's windshield.

The above procedure aligns the steering wheel centering unit 28 with respect to the center line A of the steering wheel 30. As discussed above, connecting elements 70a, 70b are generally symmetric about a top to bottom axis or center line A of the steering wheel 30. By adjusting the arms 66a, 66b of the centering unit 28 to a width so that the arms 66a, 66b rest at the connection between the steering wheel 30 and the connecting elements 70a, 70b and positioning the centering unit 28 on the steering wheel 30, the angle between the arms 66a, 66b is bisected by the center line A of the steering wheel 30. Such alignment is necessary for correctly positioning the steering wheel centering unit sensing assembly 60 on the steering wheel 30.

The steering wheel centering unit sensing assembly 60 includes an electronic level 104 which defines a level line. The electronic level 104 senses the deviation in position of the level line from a horizontal position. The electronic level 104 is positioned on the base 78 of the centering unit 28 such that the level line is perpendicular to a line bisecting the angle formed by the steering wheel holding assembly arms 66a, 66b. In this manner, when the centering unit 28 is correctly positioned on the steering wheel 30, as discussed above, the level line is perpendicular to the center line A of the steering wheel 30. Accordingly, when the level line is in a horizontal position, the center line A of the steering wheel is in a centered position.

The centering unit sensing assembly 60 further includes a battery 106 and a transceiver 108, as shown in FIG. 3. The battery 106 is attached to the base 78 of the centering unit 28 and is used to generate power for the electronic level 104 and the sensing assembly transceiver 108. Accordingly, the battery 106 is connected with the level 104 and the sensing assembly transceiver 108 in a manner to transfer energy to these parts for normal operation. Also included in the centering unit sensing assembly 60 is an on/off switch for turning the battery 106 on to generate power for operating the electronic level 104 and the sensing assembly transceiver 108. The centering unit sensing assembly 60 further includes a cover 110, shown in FIGS. 1 and 3, which covers the battery 106 and the sensing assembly transceiver 108. FIG. 1 further shows an attachment assembly 112 for assembling the base 78 of the centering unit 28.

In operation, the centering unit 28 is positioned on a steering wheel 30 by an operator. Power is provided to the electronic level 104 and the sensing assembly transceiver 108 by the operator positioning the sensing assembly on/off switch in the "on" position. With the electronic level 104 operational, the angular deviation of the level line from horizontal is sensed. This deviation is communicated to the sensing assembly transceiver 108 by an electronic signal which is proportional to the angle of deviation. This signal is received by the sensing assembly transceiver 108 and converted to an infrared pulse modulated signal. The frequency of the infrared signal is proportional to the angle of displacement. It should be noted that the transceiver 108 can transmit the signal corresponding to the angle of displacement in other forms, such as, for example, radio signals, acoustic signals, or other forms of light. However, an infrared signal is considered to be the form of signal least susceptible to interference in a factory environment. The infrared signal is sent from the sensing assembly transceiver 108 to the electronic centering apparatus 32.

As discussed above, the electronic centering apparatus 32 includes a centering apparatus transceiver 34 for receiving infrared signals from the sensing assembly transceiver 108. As seen in FIG. 2, the centering apparatus transceiver 34 is positioned directly in front of the vehicle 20. The centering apparatus transceiver 34 can be positioned at other locations with the limitation that it be within range of the signal transmitted by the sensing assembly transceiver 108. For example, if the sensing assembly transceiver 108 were positioned on the centering unit 28 in such a manner that signals were transmitted directly out the window on the driver's side of the vehicle rather than straight through the windshield, the centering apparatus transceiver 34 could be positioned directly in line with the driver's window.

The centering apparatus transceiver 34 receives the infrared signal from the sensing assembly transceiver 108 which corresponds to the angle of displacement of the steering wheel 30 from a centered position. The centering apparatus transceiver 34 sends a signal to the processor 36 via the transceiver conducting lines 52 which corresponds to the signal received from the sensing assembly transceiver 108.

The signal received from the centering apparatus transceiver 34 by the processor 36 is converted by the processor 36 into the number of degrees and direction of deviation from a centered position of the steering wheel 30. A signal corresponding to the deviation from a centered position of the steering wheel 30 is transmitted from the processor 36 to the display unit 38 via the display conducting line 56. The display unit 38 converts this signal into a visual display representing the deviation. The display unit 38 is positioned on the pole 46 by means of a fastener 54c in position so that an operator in or near the driver's seat of the vehicle 20 can observe the display. In this manner, the operator can manually adjust the position of the steering wheel 30 to decrease the angle of displacement, as indicated on the display unit 38, of the steering wheel 30. The display unit 38 displays both the magnitude of angular displacement and direction. The operator, therefore, knows which direction to adjust the steering wheel 30 and approximately how far to adjust it. While the steering wheel centering unit 28 is relatively firmly attached to the steering wheel 30 and the molding of the vehicle's windshield, sufficient play in the centering unit 28 exists so that the steering wheel position can be adjusted to correct deviations from a centered position.

The present invention also involves use of the controller 42 which controls operation of the automatic wheel alignment unit 24. Automatic wheel alignment systems are known, such as the one shown in commonly owned U.S. Pat. No. 4,380,875 to Erickson, Apr. 26, 1983. As discussed above, the present invention provides an apparatus for preventing alignment of the wheels of a vehicle unless the steering wheel is within a preselected tolerance of a centered position. The wheel alignment unit 24, as shown in FIG. 2, includes wheel alignment rollers 26 and a pit 114. This apparatus measures and displays the toe and camber angles of the wheels of the vehicle for adjustment by an operator.

In conjunction with the wheel alignment unit 24, the present invention can include a control unit 42 which is electrically connected with the processor 36 by means of control unit conducting lines 58. The processor unit 36 can be preprogrammed with an acceptable tolerance of deviation of the steering wheel 30 from a centered position. The actual deviation measured by sensing unit assembly 60 is compared with the tolerance by the processor 36. If the actual deviation is greater than the tolerance, the processor 36 sends a signal to the control unit 42 indicating that the steering wheel position is not within an acceptable tolerance. When the control unit 42 receives a signal indicating that the steering wheel 30 is not within an acceptable tolerance of a centered position, the control unit 42 prevents operation of the wheel alignment unit 24. If the actual deviation is within the acceptable tolerance, the processor 36 sends a signal to the control unit 42 indicating that the steering wheel 30 is in an acceptable position. Upon receipt of such a signal, the control unit 42 allows operation of the wheel alignment unit.

After comparison of the actual deviation from a centered position of the steering wheel 30 with the preprogrammed tolerance, the processor unit 36 can send a signal to the centering apparatus transceiver 34 indicating whether the actual position is within the tolerance. In this embodiment of the invention, the centering apparatus transceiver 34 converts the signal to a corresponding infrared transmission to the sensing assembly transceiver 108. This signal is received by the transceiver 108 and if the actual deviation is within the tolerance, the sensing assembly transceiver 108 activates an indicator light 116, shown in FIG. 1. In this manner, an operator inside the vehicle 20 can easily determine whether the steering wheel is properly centered.

In view of the foregoing, advantages over known devices are apparent. The present invention provides a method for accurately determining the position of a steering wheel and correcting that position to a centered position, without relying on human accuracy of judging either the centered position of a steering wheel or the level position of a visually operated level. The apparatus of the present invention is useful for vehicles having differently configured steering wheels. By practice of the present invention, steering wheels can be centered to a desired position before alignment of the vehicle wheels without the need for connecting wires between the unit inside the vehicle and apparatus positioned in the wayside. The present invention further provides for an automatic system for preventing alignment of vehicle wheels by an automatic alignment unit until the steering wheel is within a predetermined tolerance of a centered position.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. An apparatus for positioning a vehicle steering wheel to within a pre-selected tolerance of a centered position, comprising:
   first means for sensing a deviation in the position of the steering wheel from a centered position;
   second means mounted to the vehicle steering wheel for supporting said first means, said second means including holding means for use in engaging differently configured vehicle steering wheels; and
   wherein said holding means comprises first and second cams and a pair of cam arms, each of said cams being connected to one of said cam arms.

2. An apparatus, as claimed in claim 1, wherein:
   said holding means further comprises means for linking said first and second cams in a manner that movement of either cam causes an opposite direction movement of equal magnitude of the other cam.

3. An apparatus, as claimed in claim 2, wherein:
   said means for linking comprises first and second crossing straps, each of said straps having a first and a second end and a top and a bottom surface, and wherein each of said straps has said first end connected to said first cam and said second end connected to said second cam, and wherein said straps are positioned along said first and second cams such that each strap has tension.

4. An apparatus, as claimed in claim 3, wherein:
   said first and second cams have edge surfaces;
   said first strap is connected to said edge surface of said first cam at said top surface and to said edge surface of said second cam at said bottom surface; and
   said second strap is connected to said edge surface of said first cam at said bottom surface and to said edge surface of said second cam at said top surface.

5. An apparatus, as claimed in claim 1, wherein:
   said first and second cams have parallel axes of rotation; and
   said cam arms rotate in a single plane, said plane being perpendicular to said axes of rotation.

6. An apparatus, as claimed in claim 1, wherein:
   each of said cam arms includes engaging means for engaging said steering wheel.

* * * * *